United States Patent [19]

Kollross

[11] 4,370,780
[45] Feb. 1, 1983

[54] PROCESS AND DEVICE FOR AXIAL SHIRRING OF A TUBULAR MATERIAL USING AN AIR STREAM

[76] Inventor: Gunter Kollross, AM Wallerstadter Weg 20, D-6081 Dornheim, Fed. Rep. of Germany

[21] Appl. No.: 220,893

[22] Filed: Dec. 29, 1980

[30] Foreign Application Priority Data

Dec. 29, 1979 [DE] Fed. Rep. of Germany ....... 2952715

[51] Int. Cl.³ .............................................. A22C 13/02
[52] U.S. Cl. ......................................... 17/49; 17/1 R; 17/42
[58] Field of Search ....................... 17/41, 42, 33, 1 R, 17/49; 138/118.1

[56] References Cited

U.S. PATENT DOCUMENTS 3,245,108 4/1966 Voigt .................................. 17/42 X
4,185,358 1/1980 Regner et al. .......................... 17/42

Primary Examiner—Willie G. Abercrombie
Attorney, Agent, or Firm—Larson and Taylor

[57] ABSTRACT

The axial shirring of thin walled inflated tubular material, especially for sausage manufacture, with a mandrel providing a radial bracing in its interior, occurs in combination with at least one air stream directed obliquely against the axis of the tubular material, wherein the air stream force is allowed to revolve about the said axis as the tubular material moves axially along the mandrel. The tubular material is thereby axially compacted against a stop with formation of regular folds or "shirrings". Shirring formation can be readily influenced by changing the air pressure. The nozzle or nozzles is or are connected to a source of compressed air and can be directed obliquely against the mandrel axis as it or they revolve about the said mandrel axis.

14 Claims, 5 Drawing Figures

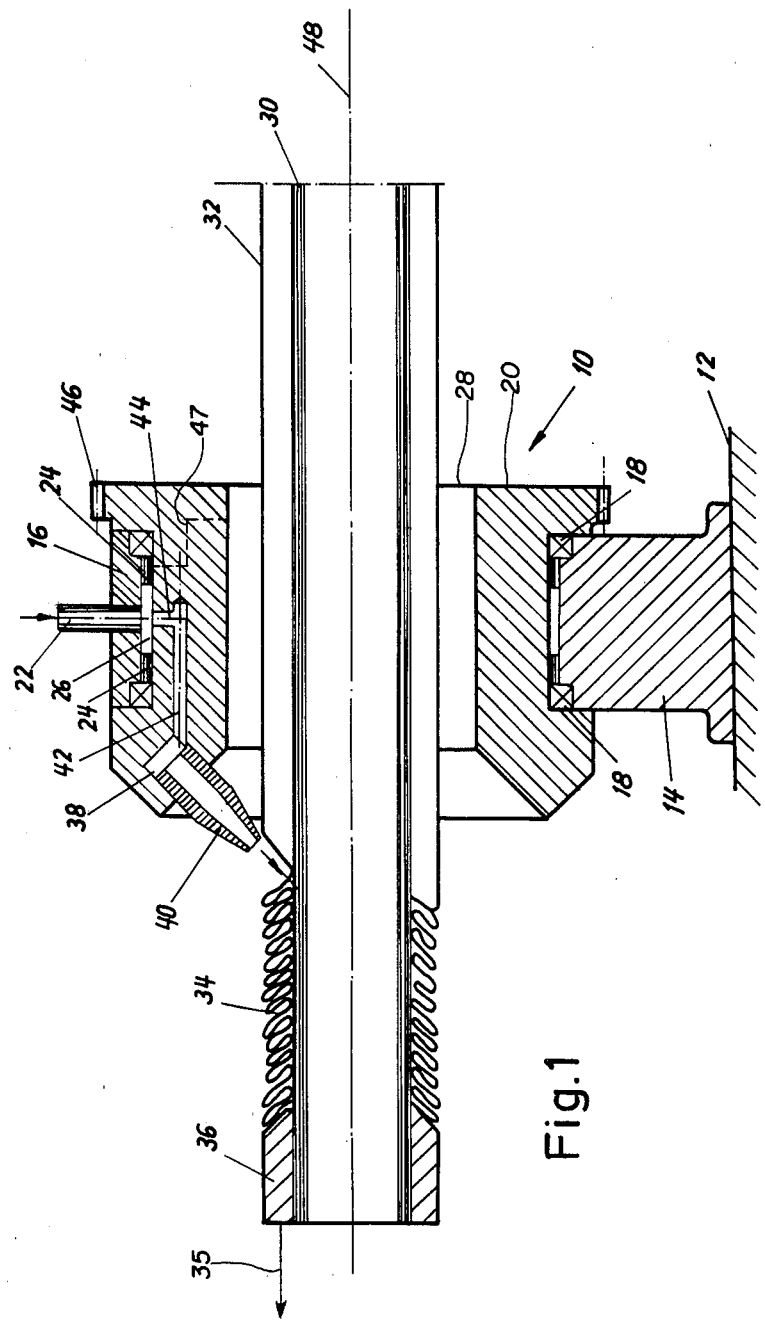

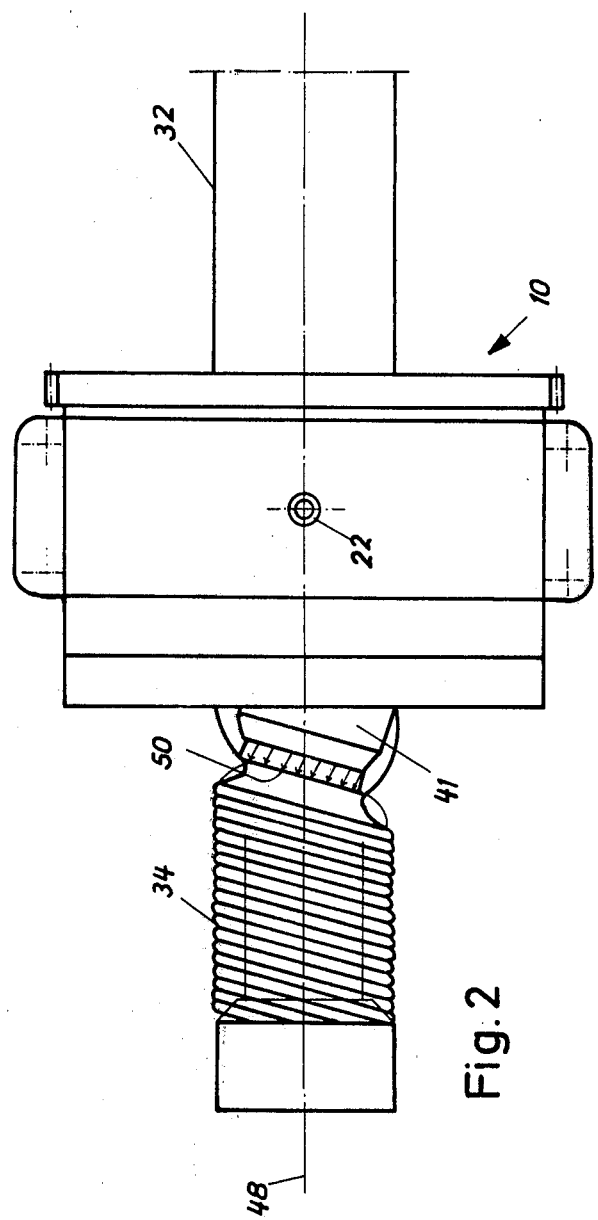

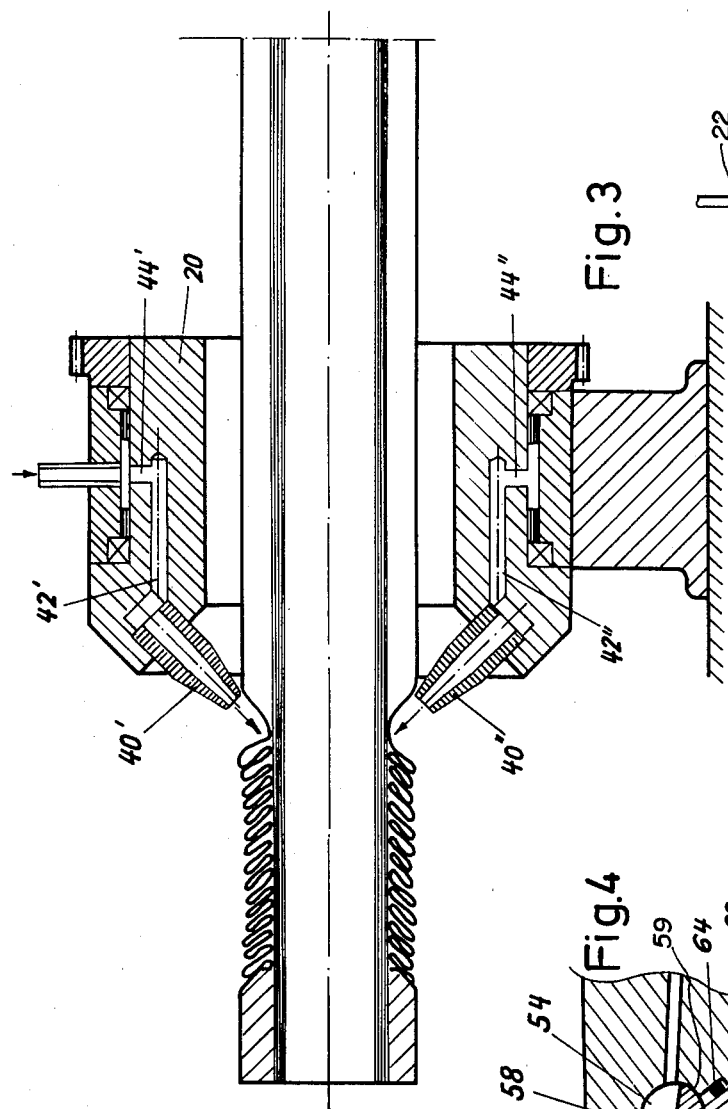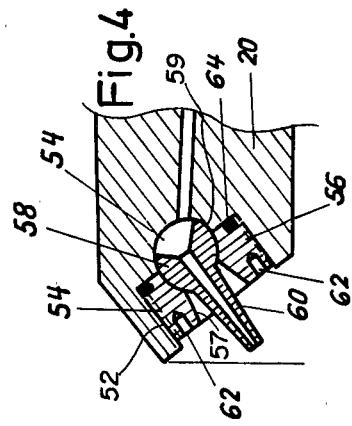
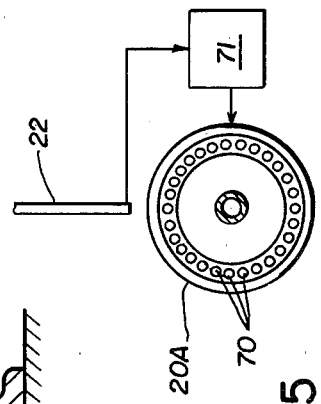

PROCESS AND DEVICE FOR AXIAL SHIRRING OF A TUBULAR MATERIAL USING AN AIR STREAM

The invention relates to a process and device for axial shirring of thin walled inflated tubular material, especially for sausage manufacture, in which the tubular material is radially braced internally and is axially compressed against a stop by a force delivered by a means which is stationary against axial movement as it revolves about the axis of the tube, with formation of regular folds or "shirrings", against a counter force such as a backstop.

Many processes and devices are known for shirring great lengths of thin walled tubes made of cellulose or plastic material into manageable form on a tube, in which, by means of suitable stuffing machines, they are filled with pasty material. The tube serves radially to support the tubular material during the shirring process and thereby to impart to the tubular shirring which results from the shirring process a specific internal diameter. In addition, the tubular material is lightly inflated through the tube during the shirring process to provide the necessary taut configuration for the action of the shirring forces. The means for shirring the tubular material are generally toothed wheels or attachments fixed on circulating chains.

It is also known that the force that axially compacts the tubular material can be applied by means of a rotating sleeve with internal toothing in a helix, which sleeve surrounds the tubular material. All of these devices have the disadvantage that the tubular material is directly engaged mechanically and is stressed, to varying degrees. Especially in the case of thin walled natural filament tubes with a collagen base there is therefore the risk that the tubular material will be imperceptibly damaged during shirring.

The present invention therefore relates to the problem of providing a process and device, of the type in question, in which these disadvantages will be eliminated.

According to the present invention, these problems are solved by providing a process and device in which the shirring force is applied by at least one air stream directed obliquely against the axis of the tubular material.

With the process and device of the present invention there is thus avoided any mechanical contact with the tubular material in the course of shirring, and the tubular material nonetheless will be bent in pneumatically in the form of helicoidal folds or "shirrings". It is thereby possible, by changing the air pressure and the peripheral speed of the air stream, to affect the shirring formation during the shirring process and to create an optimal shirring configuration. This is further advantageously promoted in that the angle at which the air stream impinges on the tubular material axis is variable.

As experiments have shown, the shirring formation can be further promoted in that the nozzle which delivers the air stream can be elongated in the peripheral direction, to direct such an elongated air stream against the tubular material. It is particularly advantageous if the cross section of the air stream follows a helical line about the axis of the tubular material.

With small tube calibers (diameters) a single revolving air stream will generally suffice. However, with larger tube calibers it is advantageous if two or more air streams are distributed about the periphery of the tube and engage the tube simultaneously so that the shirrings will be formed as a multi-thread screw.

Shirring formation can also be promoted by prefolding the tubular material by at least one air stream which axially leads the shirring forming air stream and revolves with it.

A device for execution of the process of the invention, with a mandrel which passes through the tubular material and a backup which engages the shirred end of the tubular material and guidedly moves back in the course of the shirring is characterized in an embodiment of the invention which includes at least one nozzle which can be connected to a source of compressed air and which is directed obliquely against the mandrel axis.

According to one advantageous feature of the invention, the nozzle is rotatably drivable to revolve about the mandrel axis, and according to another feature of the invention, the angle of the nozzle relative to the mandrel axis can be varied.

According to an alternative embodiment of the invention the device may be constructed with a ring of non-rotatable nozzles regularly and stationarily distributed about the mandrel axis which can be peripherally and successively switched on and off to provide an effect equivalent to a rotating nozzle.

Other features of the device according to the invention are evident from the following detailed description of preferred embodiments of the invention, together with the accompanying drawings, wherein:

FIG. 1 is an axial, sectional view, showing a first embodiment of the invention with a nozzle mounted to revolve about the axis of the tubular material which is to be shirred.

FIG. 2 is a plan view of a device which is essentially the same as that shown in FIG. 1, except that it shows a modified nozzle structure.

FIG. 3 is an axial sectional view of a device similar to that shown in FIG. 1 but including a pair of nozzles located 180° apart from each other.

FIG. 4 is an axial sectional view through an alternative form of a nozzle which can be adjusted by means of a ball cup bearing.

FIG. 5 is a partial end view, as if taken from the left side of FIG. 1, but illustrating a modified arrangement for delivering the air stream.

The device of FIG. 1, which is designated as a whole by numeral 10 comprises a stand 14 fixed on a machine bed 12 and recessed on its upper side in the form of a semi-cylindrical recess which forms semi-cylindrical cover 16 a bearing housing in which is mounted rotating nozzle housing 20, borne by ball bearings 18. Cover 16 has a compressed air connection 22 which opens into an annular chamber 26 defined by packings 24 on the outer periphery of nozzle housing 20.

Nozzle housing 20 includes a central bore 28 which encircles a tubular mandrel 30 which is of substantially smaller diameter, on which the tubular material 32 which is to be shirred is drawn and shirred, as described in detail below, to form shirrings 34 against a backup 36 which constantly moves back in the course of the shirring, as represented by arrow 35 in FIG. 1.

At the end of housing 20 facing toward backup 36, bore 28 is conically widened and receives a nozzle 40 in an outwardly slanted threaded bore 38 which is connected via an axial bore 42 and a radial bore 44 inside nozzle housing 20 to annular chamber 26.

At the other end the nozzle housing 20 presents a gear toothing 46 on its outside, which may be engaged by a drive motor (not shown), advantageously via a belt (also not shown).

When the drive motor is switched on and compressed air is supplied via connection 22, a stream of air issues from the nozzle 40 as it revolves about axis 48 of shirring tube 30, slanted against the axis 48, which stream of air continuously bends the tubular material 32 in at its periphery and lays it in helicoidal folds or shirrings 34 about mandrel 30, against backup 36.

As illustrated in FIG. 2, the nozzle may advantageously be made as shown at 41 as a flat nozzle, the opening 50 of which is inclined at an angle of less than 90° with reference to mandrel axis 48, so that the elongated nozzle opening is applied on a helical line corresponding to the resulting helicoidal shirrings 34.

FIG. 3 shows a device similar to that shown in FIG. 1, in which, however, two nozzles 40' and 40'' with corresponding conduits 42', 42'' and 44', 44'' are disposed in nozzle housing 20. The remainder of the construction is similar to that of the embodiment according to FIG. 1.

Since in the device according to FIG. 3 the tubular material is bent in and shirred simultaneously at two diametrically opposed places, the turning of the nozzles about axis 48 naturally produces two screw-threads on which the shirrings come to lie.

Also in the form of embodiment according to FIG. 3, the nozzles may be made as flat nozzles which extend advantageously with their openings on a helical line, i.e., of the type shown in FIG. 2.

Whereas in the examples according to FIGS. 1 to 3 the nozzles are fixedly disposed on nozzle housing 20, FIG. 4 shows an example of an adjustable nozzle fastening with which the exit angle of the nozzle can be adjusted with reference to the axis 48. For this purpose, nozzle housing 20 has a relatively large threaded bore 52, on the floor of which bore 52 there is a recessed cup part 54. A clamping ring 56 can be screwed into bore 52, whose bore 57 on the inner end is also in the form of a cup part 59 and is oppositely conical at the outer end. Between cup part 54 and clamping ring 56 a spherical head 58 of a nozzle 60 is clamped, which can be directionally adjusted by loosening clamping ring 56 by means of a wrench engaging into opposite bores 62 and retightening. An O-ring 64 prevents the issuing of leaked air between threaded bore 52 and clamping ring 56.

Nozzle 60, as shown, has a cylindrical nozzle bore. However, it may be designed so as to have a flat outlet slit which can be adapted, by loosening and retightening of clamping ring 56, to adapt to the helicoidal form of the shirrings being formed.

FIG. 5 illustrates an alternative embodiment wherein the nozzle housing which is designated as 20A does not rotate. Instead, it is provided with a ring of openings 70 distributed about the mandrel axis. In this embodiment means would be provided for switching on and off successive air openings progressively to thereby provide an effect which is the equivalent of a rotating nozzle. Preferably, the timing of the switching on and switching off of successive air jet openings would overlap. Referring to FIG. 5, there could be provided a valve member, as shown diagramatically at 71 in FIG. 5. In a manner which would be understood by one skilled in the art, this valve member may take the form of a rotating valve, which during its rotation covers and uncovers successive openings, said rotating member being driven in rotation by the compressed air source entering through line 22.

Although the invention has been described in considerable detail with respect to preferred embodiments thereof, it will be apparent that the invention is capable of numerous modifications and variations apparent to those skilled in the art, without departing from the spirit and scope of the invention, as defined in the claims.

I claim:

1. A process for axial shirring of a thin walled tubular material such as a sausage casing material, comprising the steps of:
    delivering the tubular material axially along a mandrel which braces the interior thereof, as the forward end of the tubular material engages a back-up means,
    and axially compacting the tubular material, as it is being delivered along the mandrel, by forming shirrings therein by directing at least one air stream against the tubular material in a direction which is toward the direction of travel of the tubular material and oblique relative to the axis of the tubular material, wherein the air stream force revolves about the axis of the tubular material.

2. A process according to claim 1, wherein the air stream is delivered through a nozzle which is elongated in the circumferential direction relative to the tubular material so as to impart a circumferentially elongated air stream against the tubular material.

3. A process according to claim 2, wherein the elongated cross section of the nozzle follows a helical line about the axis of the tubular material.

4. A process according to claim 1, wherein the air stream is delivered through a nozzle which revolves about the tubular material as it continuously delivers the air stream.

5. A process according to claim 1, wherein the air stream is delivered through a plurality of nozzles arranged in a ring around the tubular material, and wherein the revolving of the air stream force results from progressively opening and closing successive nozzles by a valving means.

6. A device for axial shirring of a thin walled tubular material such as a sausage casing material, comprising:
    a mandrel means for receiving a tubular material movable therealong and for bracing the interior of the tubular material, a back-up positioned to be engaged by the forward end of the tubular material which has been moved axially along the mandrel,
    shirring means for axially compacting the tubular material, as it moves along the mandrel, by forming shirrings therein, said shirring means comprising means for delivering at least one air stream against the tubular material toward the direction of travel of the tubular material and obliquely relative to the axis of the tubular material,
    and means for causing the force of the air stream to revolve about the axis of the tubular material.

7. A device according to claim 6, wherein the means for causing the force of the air stream to revolve comprises a nozzle housing which is mounted for rotation about the axis of the tubular material, a nozzle mounted therein for delivering the air stream, and means for delivering pressurized air to the nozzle as the nozzle housing revolves.

8. A device according to claim 6 or claim 7, wherein the nozzle includes means for adjusting its angle of inclination relative to the axis of the tubular material.

9. A device according to claim 5 or claim 6, wherein the nozzle has a flat, elongated opening which extends circumferentially relative to the tubular material.

10. A device according to claim 9, wherein the elongated nozzle opening is disposed at an acute angle to a transverse plane passing through the said axis of the tubular material.

11. A device according to claim 10, including means for adjusting the said acute angle.

12. A device according to claim 6, wherein the means for delivering the air stream and for causing its force to revolve about the axis of the tubular material comprises a ring of nozzles distributed about the said axis, and including means for progressively switching on and off successive nozzles.

13. A device according to claim 12, wherein the means for switching the nozzles on and off includes means for having the times of opening of successive nozzles overlap.

14. A device according to claim 12 or claim 13, including a valve member for switching the nozzles on and off, said valve member being rotatingly driven by a compressed air source.

* * * * *